Patented Feb. 20, 1951

2,542,597

UNITED STATES PATENT OFFICE 2,542,597

URETHANES OF 2-NAPHTHYL J ACID AND THEIR BROMINATED DERIVATIVES

Vsevolod Tulagin, Phillipsburg, N. J., and Willy A. Schmidt, Easton, Pa., assignors to General Aniline & Film Corporation, New York, N. Y., a corporation of Delaware No Drawing. Application April 24, 1948, Serial No. 23,138

7 Claims. (Cl. 260—470)

1

The present invention relates to urethanes of 2-naphthyl J-acid, and particularly to such compounds in which the esterifying group of the urethane radical is aliphatic.

In copending application Serial No. 740,725, filed April 10, 1947, Vsevolod Tulagin has described the preparation of the urethanes of phenyl J-acid. It is pointed out in said application that such urethanes have properties which make them much more valuable for use as dyestuff intermediates than the phenyl J-acids per se. It is noted, for instance, that the urethanes are stable both to acids and alkalies and may be kept for long periods of time without undergoing chemical decomposition. The phenyl J-acids, on the other hand, suffer from the disadvantage that they are highly unstable and are therefore difficult to prepare and store in a chemically pure state.

In our copending application Serial No. 10,925, filed February 25, 1948, entitled "2-Naphthyl J-Acid," we have described the production of the heretofore uninvestigated 2-naphthyl J-acid and the salts thereof. Our copending application stresses the fact that the 2-naphthyl J-acid is a more stable intermediate than phenyl J-acid, and produces dyes in brilliant shades showing a marked bathochromatic shift in the transmission spectra as compared with analogous dyes obtained from phenyl J-acid and its derivatives.

We have now discovered that the urethanes of 2-naphthyl J-acid, their salts and the brominated derivatives thereof are likewise stable compounds which can be easily prepared and which also share the valuable properties of the 2-naphthyl J-acid as regards the brilliance of the dyes produced therefrom.

It is accordingly an object of the present invention to prepare the urethanes of 2-naphthyl J-acid and the brominated derivatives thereof.

A further object of the present invention are the aliphatic urethanes of the 2-naphthyl J-acid and the brominated derivatives thereof.

A further object of the present invention are the urethanes of 2-naphthyl J-acid containing a long aliphatic chain.

Other and further important objects of the invention will become apparent as the description proceeds.

The compounds contemplated herein have the following structural formula:

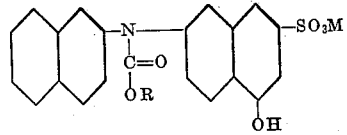

in which R is an alkyl radical such as methyl, ethyl, propyl, butyl, amyl, octyl, decyl, dodecyl, hexadecyl, octadecyl, and the like, M is hydrogen

2 or a salt-forming group such as an alkali metal, i. e., sodium, lithium, potassium and the like, ammonium or an organic base, i. e., pyridine, quinoline and the like, and the brominated derivatives of such compounds.

The urethanes are prepared by reacting 2-naphthyl J-acid with an alkyl chloro-carbonate in the presence of an acid binding agent at low temperatures while agitating the reaction mixture. Suitable chlorocarbonates are methyl chlorocarbonate, ethyl chlorocarbonate, propyl chlorocarbonate, amyl chlorocarbonate, octyl chlorocarbonate, decyl chlorocarbonate, octadecyl chlorocarbonate, and the like. Suitable acid binding agents are inorganic alkalies such as sodium hydroxide, potassium hydroxide, sodium alcoholate, sodium carbonate and the like; or organic bases such as pyridine, quinoline and the like. Where the acid binding agent is inorganic, the reaction is generally carried out in an aqueous medium. However, where an organic binding agent such as pyridine is employed, it is preferable to carry out the reaction in the presence of an organic solvent for the 2-naphthyl J-acid such as dimethyl formamide, diethyl formamide, formamide and the like. The reaction is effected by agitation of the ingredients at relatively low temperatures such as temperatures ranging from about 5 to 15° C. The low temperatures are maintained during the reaction by externally cooling the reaction mixture.

The urethanes, particularly those in which character R is a lower molecular weight alkyl group, are readily soluble in hot water and are not precipitated from such solutions by the addition of acid. The aqueous solutions of the urethanes are suitable for further condensation such as coupling reactions to produce azo and other dyes.

The invention is further illustrated by the following examples, in which the parts are by weight. It is to be understood, however, that the invention is not limited to these examples, the examples being illustrative only.

Example 1

To a suspension of 37 parts of 2-naphthyl J-acid (prepared as described in our copending application Ser. No. 10,925, filed February 25, 1948) in 200 parts of water are added 36 parts of 6-N-sodium hydroxide solution. The mixture is stirred for 15 minutes and then treated with 12 parts of ethyl chlorocarbonate. The mass is rapidly agitated and maintained at approximately 5° C. by external cooling. After about 15 minutes, 17 parts of 6-N-sodium hydroxide and 12 parts of ethyl chlorocarbonate are added, and the mixture stirred for another 15 minutes. A third portion of sodium hydroxide and ethyl chlorocarbonate is then added as above.

After stirring the reaction mixture for about an hour, the ethyl urethane precipitates, is removed by filtration and dissolved in water. The solution is then cooled to 30° C. and treated with salt solution to effect precipitation of the sodium salt of the ethyl urethane of 2-naphthyl J-acid.

*Example 2*

The procedure is the same as in Example 1 excepting the butyl chlorocarbonate is employed in lieu of the ethyl chlorocarbonate.

*Example 3*

Into a suitable vessel equipped with a water separator and an agitator are placed 360 parts of dry dimethylformamide and 360 parts of dry benzene. The mixture is refluxed for a period of 2 to 5 hours, until no more water is obtained in the water separator. The mixture is then distilled until 170 parts of distillate have been obtained. 75 parts of the pure dry pyridine salt of 2-naphthyl J-acid (prepared according to our above application) are introduced and the mixture is heated with stirring until complete solution has taken place. The vessel is now equipped with a thermometer and means for slow introduction of liquids and the content is cooled to 6° C. 2-hexadecylchloroformate (75 parts) is cautiously introduced, maintaining the temperature below 10° C. When a homogeneous solution has been obtained, pyridine (55 parts) is slowly added with good agitation, maintaining the temperature below 10° C. The resulting dark brownish red solution is stirred at 5 to 10° C. for a period of 2 hours. The temperature is then raised to 18-25° C. and the mixture is stirred for 16 to 24 hours.

The resulting suspension is evaporated to dryness with the aid of a good vacuum. The residue is extracted with 750 parts of dry benzene. The insoluble material is removed by filtration and discarded. The clear benzene filtrate is evaporated at 100° C. and 22 mm. pressure. The residue is dissolved in 1,000 parts of hot glacial acetic acid and the solution is cooled at 25° C. The insoluble waxy material which separates at this point is removed by filtration and discarded.

A mixture of 750 parts glacial acetic acid, 200 parts of acetic anhydride and 500 parts of concentrated hydrochloric acid is prepared and cooled to 20° C. The acetic acid solution of the 2-naphthyl urethane obtained above is added to this hydrochloric acid solution with rapid agitation and the mixture is maintained at 20° C. for a period of 1 to 2 hours. The granular precipitate is cooled by filtration, washed with acetic acid, and dried. This solid is dissolved in 325 parts of ethyl alcohol. Lithium carbonate (50 parts) is added, and the mixture is stirred for one-half hour. The insoluble lithium salts are removed by filtration, and the filtrate is evaporated to dryness. The residue consists of the lithium salt of 2-hexadecyl urethane of 2-naphthyl J-acid. It may be used as such as a dye intermediate or may be added to photographic emulsions if it is desired to use the material as a "color former."

*Example 4*

The procedure is the same as in Example 3 excepting that the hexadecylchloroformate is replaced by octadecylchloroformate.

*Example 5*

Into a suitable vessel are placed 63 parts of the lithium salt of 2-hexadecyl urethane of 2-naphthyl J-acid (prepared as in Example 3), 625 parts of acetic anhydride, 625 parts of glacial acetic acid and 63 parts of sodium acetate. The mixture is refluxed for 2 hours and is then cooled to 10-15° C. A solution of 16 parts of bromine dissolved in 100 parts of glacial acetic acid is slowly introduced at 10° C. with continuous agitation. After 2 hours the mixture is evaporated to dryness and the residue is crystallized from ethyl alcohol. There is thus obtained a good yield of $x$-bromo-2-hexadecyl urethane of 2-naphthyl J-acid in the form of its sodium salt.

Various modifications of the invention will occur to persons skilled in the art. For instance, the urethanes contemplated herein may be converted to their sulfuric acid esters by procedures described in the literature for J-acid and its N-phenyl derivatives. We therefore do not intend to be limited in the patent granted except as necessitated by the prior art and the appended claims.

We claim:

1. Compounds selected from the group consisting of those of the following structural formula:

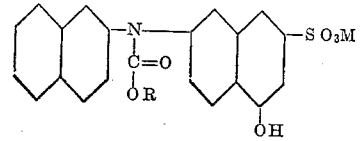

wherein M is selected from the class consisting of hydrogen and salt-forming radicals, and R is alkyl and the mono-brominated derivatives of said compounds.

2. The ethyl urethane of 2-naphthyl J-acid.

3. The hexadecyl urethane of 2-naphthyl J-acid.

4. The mono-brominated derivative of the hexadecyl urethane of 2-naphthyl J-acid.

5. Compounds as defined in claim 1 wherein R is an alkyl radical containing at least 8 carbon atoms.

6. The butyl urethane of 2-naphthyl J-acid.

7. The octadecyl urethane of 2-naphthyl J-acid.

VSEVOLOD TULAGIN.
WILLY A. SCHMIDT.

REFERENCES CITED

The following references are of record in the file of this patent:

UNITED STATES PATENTS

| Number | Name | Date |
|---|---|---|
| 1,731,643 | Wagner et al. | Oct. 15, 1929 |
| 2,055,377 | Fleischauer | Sept. 22, 1936 |
| 2,347,042 | Fleischauer | Apr. 18, 1944 |
| 2,445,252 | Tulagin | July 13, 1948 |